(12) United States Patent
Ruch et al.

(10) Patent No.: US 8,111,511 B2
(45) Date of Patent: Feb. 7, 2012

(54) ELECTRONIC DEVICE PHYSICAL SECURITY COMPONENT

(75) Inventors: Mark H. Ruch, The Woodlands, TX (US); Paul J. Doczy, Cypress, TX (US); Earl W. Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 970 days.

(21) Appl. No.: 12/011,368

(22) Filed: Jan. 25, 2008

(65) Prior Publication Data
US 2009/0193528 A1    Jul. 30, 2009

(51) Int. Cl.
*G06F 1/16*    (2006.01)

(52) U.S. Cl. .................. 361/679.57; 345/163; 312/240; 248/166

(58) Field of Classification Search .............. 16/297, 16/303, 290, 330; 292/169.17, 363.3; 455/550.1; 224/666; 345/168, 173, 32, 1.1, 1.3, 163, 345/8, 104, 419, 619; 361/679.01, 679.21, 361/679.26, 679.27, 679.09, 679.06, 679.58, 361/679.25; 312/223.1, 401, 240; 348/40, 348/77, 148; 248/176.1, 274.1, 166
See application file for complete search history.

(56) References Cited

U.S. PATENT DOCUMENTS

| | | |
|---|---|---|
| 5,351,508 A | 10/1994 | Kelley |
| 5,361,610 A | 11/1994 | Sanders |
| 5,446,618 A | 8/1995 | Tetsuya et al. |
| 5,447,044 A | 9/1995 | Cheng |
| 5,447,045 A | 9/1995 | Cheng |
| 5,526,226 A | 6/1996 | Katoh et al. |
| 5,787,738 A | 8/1998 | Brandt et al. |
| 5,960,651 A | 10/1999 | Tanisawa |
| 6,178,089 B1 | 1/2001 | Alfonso et al. |
| 6,244,082 B1 | 6/2001 | Avganim |
| 6,389,854 B1 | 5/2002 | Huang |
| 6,788,216 B2 | 9/2004 | Chen |
| 2008/0220812 A1* | 9/2008 | Wang ........................ 455/550.1 |
| 2009/0001116 A1* | 1/2009 | Meng ............................ 224/666 |

FOREIGN PATENT DOCUMENTS

JP    2004318426    11/2004
* cited by examiner

*Primary Examiner* — Hung Duong

(57) ABSTRACT

A portable electronic device comprises a physical security component configured to be in a retracted position and an extended position relative to a housing of the portable electronic device, the physical security component having at least two differently shaped openings enabling at least two different types of locking devices to be coupled to the at least two differently shaped openings.

19 Claims, 5 Drawing Sheets

ELECTRONIC DEVICE PHYSICAL SECURITY COMPONENT

BACKGROUND

Portable electronic devices typically include a physical security feature which enables the electronic device to be secured to a particular location and prevent the potential theft and/or unauthorized removal of the portable electronic device. However, the physical security feature is typically limited to a slot into which a particular type of locking element may be inserted.

DETAILED DESCRIPTION OF THE DRAWINGS

Figure 1:
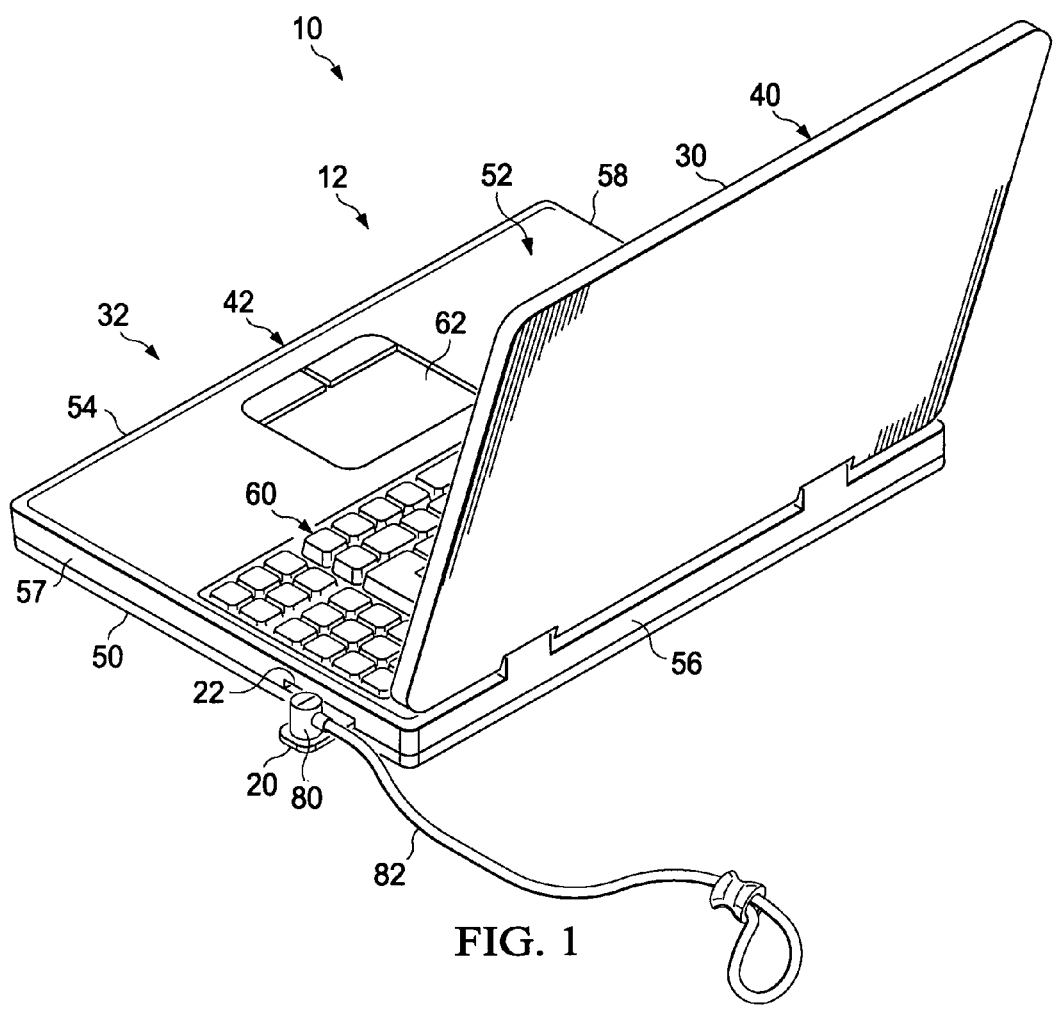
FIG. 1 illustrates an electronic device in which an embodiment of a physical security component is employed to advantage.

FIG. 1 illustrates a portable electronic device 10 in which an embodiment of a physical security component 20 is employed to advantage. In the illustrated embodiment, physical security component 20 is configured to enable at least two different types of locking devices to be used to physically secure portable electronic device 10 at a particular location. In FIG. 1, portable electronic device 10 is a laptop or notebook computer 12. However, it should be understood that portable electronic device 10 can be any other type of mobile electronic device such as, but not limited to, a tablet computer, a personal digital assistant (PDA), or a cellular phone.

In the illustrated embodiment, portable electronic device 10 comprises a display member 30 rotably coupled to a base member 32. Display member 30 and base member 32 each comprise housings 40 and 42, respectively, for housing and/or supporting one or more components of portable electronic device 10. For example, in the illustrated embodiment, base member 32 comprises a bottom wall 50, a working surface 52, a front wall 54, a back wall 56, and side walls 57 and 58. In some embodiments, working surface 52 comprises a keyboard 60 and a touch pad 62. Base member 32 and/or display member 30 may be configured having various interfaces for communicatively engaging different types of components (e.g., disposed along any of walls 50, 52, 54, 56, 57 and 58).

In FIG. 1, physical security component 20 is coupled to and disposed along side wall 57 of housing 42. It should be understood, however, that physical security component 20 may be disposed along any of walls 50, 52, 54, 56, or 58 of housing 42 or elsewhere on portable electronic device 10 (e.g., on display member 30). In FIG. 1, physical security component 20 is configured to be nested in and/or recessed within a housing (e.g., housing 42) of portable electronic device 10 via a slot 22. Slot 22 is an opening and/or aperture disposed along side wall 57 of housing 42 in which physical security component 20 may be slide ably, hingeably, and/or rotably inserted. In FIG. 1, physical security component 20 is illustrated in an "extended position," or a position which is extended away from or beyond the periphery of housing 42 of portable electronic device 10. When in an extended position, a locking device (e.g., a lock 80, a pad lock, etc.) may be secured to physical security component 20 to physically secure portable electronic device 10 at a particular location. When physical security component 20 is nested inside and/or otherwise retracted in slot 22, physical security component 20 is in a "home position" or a position in which physical security component 20 is disposed at least partially retracted in slot 22 and is contained at least partially within the boundary or periphery of housing 42. In some embodiments, an external side of physical security component 20 is aligned flush with side wall 57 when physical security component 20 is in a home position.

In FIG. 1, physical security component 20 is configured to enable a plurality of different security devices to be secured and/or coupled to physical security component 20. For example, in FIG. 1, lock 80 is coupled to physical security component 20. Lock 80 may comprise a key-based, combination-based, or other type of locking element that is coupled to a cable 82 which enables a user to wrap cable 82 around a stationary object (e.g., a table, a chair leg, etc.), thereby physically securing portable electronic device 10 and/or preventing unauthorized removal of portable electronic device 10. It should be understood, however, that physical security component 20 may enable other types of locking devices (e.g., a padlock, etc.) and/or more than one locking device to simultaneously be used to secure portable electronic device 10.

Figure 2A:
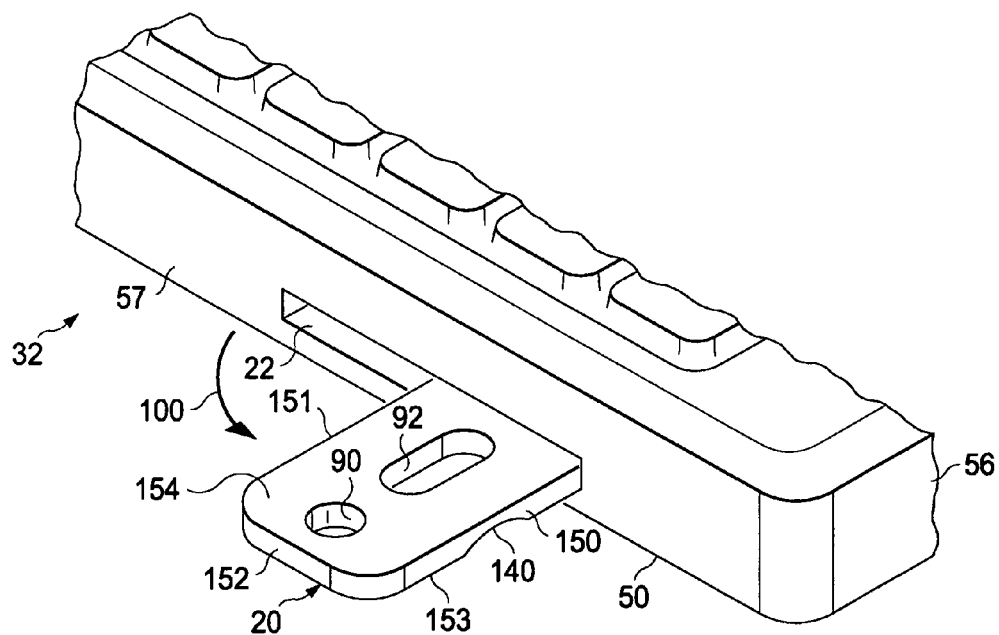
FIG. 2A illustrates an embodiment of the physical security component of FIG. 1.
Figure 2B:
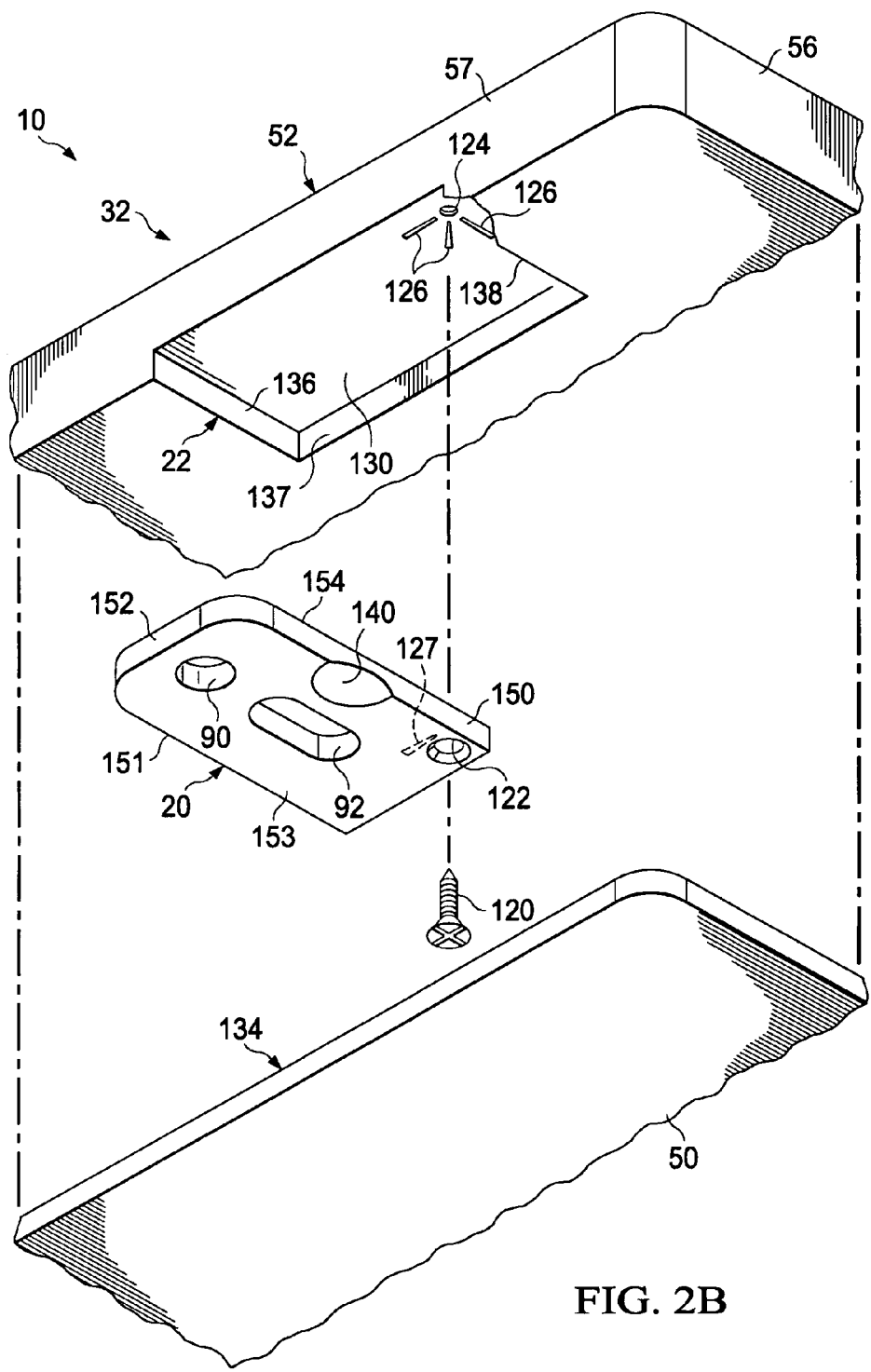
FIG. 2B illustrates an exploded assembly view of the physical security component of FIG. 2A.

FIGS. 2A and 2B illustrate an embodiment of physical security component 20. Referencing FIG. 2A, physical security component 20 is pivotable and/or rotatable in a direction 100 and opposite thereto relative to housing 42 to enable movement thereof between home and extended positions relative to slot 22. In FIG. 2A, physical security component 20 comprises a lock hole 90 and a slot 92 which enable a locking device (e.g., a pad-lock, a lock 80 (FIG. 1), etc.) to be secured and/or disposed in corresponding lock hole 90 and/or slot 92. Lock hole 90 and slot 92 are configured to enable two different types of locking devices to be secured to physical security component 20. For example, lock hole 90 is a circular in shape and sized to enable a pad-lock and/or similar locking device to be coupled and/or secured to electronic device 10. In some embodiments, slot 92 is an elliptical shape and sized to enable lock 80 and/or similar locking device that uses an elliptical, rectangular or other similar locking element to be inserted therethrough and secured to electronic device 10. In FIG. 2A, when physical security component 20 is in an extended position, slot 92 is disposed in a proximal position and lock hole 90 is in a distal position relative to side wall 57 of base 32. However, it should be understood that the positions of lock hole 90 and slot 92 may be interchanged and/or otherwise oriented (e.g., side-by-side, etc.). It should also be understood that more and/or fewer openings (e.g., lock hole 90, slot 92, etc.) may be disposed on physical security component 20.

In FIG. 2B, physical security component 20 is illustrated in an extended position relative to side wall 57. In FIG. 2B, physical security component 20 is configured to be rotated in and out of slot 22 between working surface 52 and bottom wall 50 of base member 32. Slot 22 comprises a top wall 130, bottom wall 134, and side walls 136, 137, and 138. In some embodiments, physical security component 20 is configured to be secured to top wall 130 of slot 22 using a fastener 120

(e.g., a screw, a bolt, etc.). However, it should be understood that physical security component 20 may be fastened to any of walls 134, 136, 137, and/or 138 or otherwise secured to housing 42. Fastener 120 is configured to slide through aperture 122 disposed on physical security component 20 and then into aperture 124 disposed along top wall 130 within slot 22. In operation, physical security component 20 rotates about the axis created by fastener 20, thereby enabling physical security component 20 to be positioned in a home position, an extended position, or any other position therebetween.

In FIGS. 2A and 2B, physical security component comprises side walls 150 and 151, front wall 152, bottom wall 153, and top wall 154. In FIGS. 2A and 2B, physical security component 20 comprises a grip 140 medially disposed along side wall 150. Side wall 150 is a wall of physical security component 20 that generally resides flush with side wall 57 of housing 42 when physical security component 20 is located in a home or retracted position relative to housing 42. It should be understood, however, that grip 140 may be disposed along any portion of physical security component 20. In FIGS. 2A and 2B, grip 140 is configured to facilitate the removal of physical security component 20 from slot 22. In the illustrated embodiment, grip 140 is a tapered portion configured to enable a user to insert a finger and/or other mechanism into grip 140. It should be understood, however, that grip 140 may be any other shape (e.g., rectangular, circular, etc.) and be any other type of gripping mechanism (e.g., a gripping pad, etc.).

In some embodiments, slot 22 may comprise one or more detents 126 configured to enable physical security component 20 to be secured in discrete locations at or between the retracted position and the extended position. Thus, instead of enabling physical security component 20 to freely rotate in and/or out of slot 22 relative to side wall 57, detents 126 limits and/or prevents physical security component 20 from rotating beyond the position of one of detents 126 until a force sufficient to overcome one of detents 126 is applied to a portion of physical security component 20. In some embodiments, physical security component 20 comprises corresponding detent 127 (drawn in phantom) on a top wall 154 along the periphery of aperture 122. Top wall 154 is disposed adjacent to top wall 130 of slot 22 when physical security component 20 is in a retracted position. Thus, in operation, detent 127 engages one of detents 126 as physical security component 20 rotates in direction 100 or opposite thereto. When detents 126 and 127 engage, detent 126 limits and/or stops the movement of physical security component 20 in a position corresponding to the location of one of detents 126. A force applied to a portion of physical security component 20 can overcome engaged detent 126 and enable physical security component 20 move until detent 127 engages another one of detents 126 or physical security component is in a fully retracted or fully extended position.

In some embodiments, physical security component 20 may also be configured with an actuation mechanism (e.g., spring actuated button, etc.) to enable physical security component 20 to automatically open and/or extend upon activation of the actuation mechanism (e.g., a push-pus spring-based mechanism). Moreover, in some embodiments, side wall 57 and/or slot 22 may also comprise a locking mechanism which locks physical security component 20 in place when physical security component 20 is in a home and/or fully retracted position.

Figure 3A:
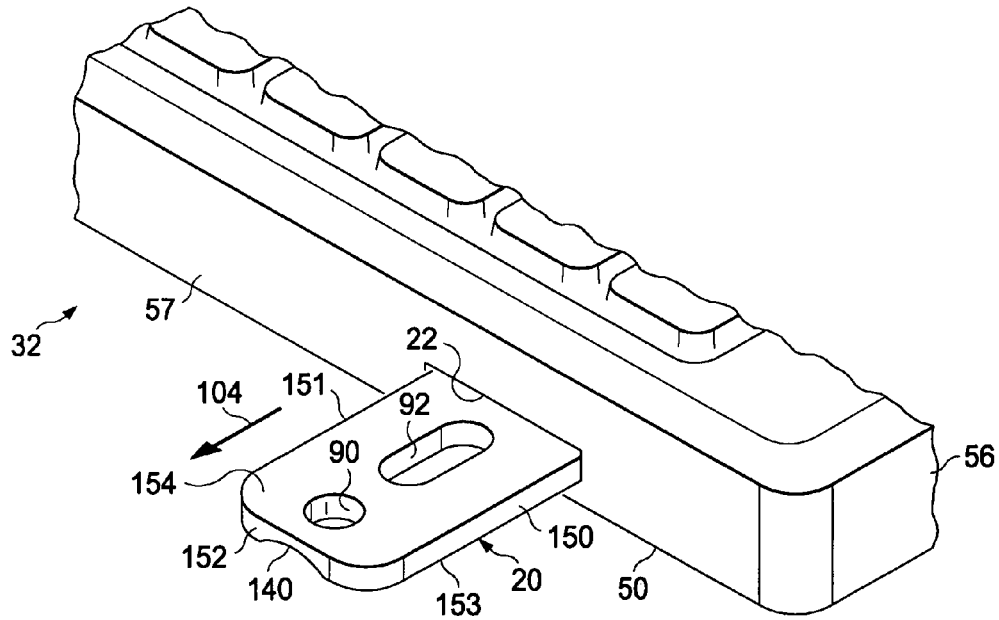
FIG. 3A illustrates another embodiment of the physical security component of FIG. 1
Figure 3B:
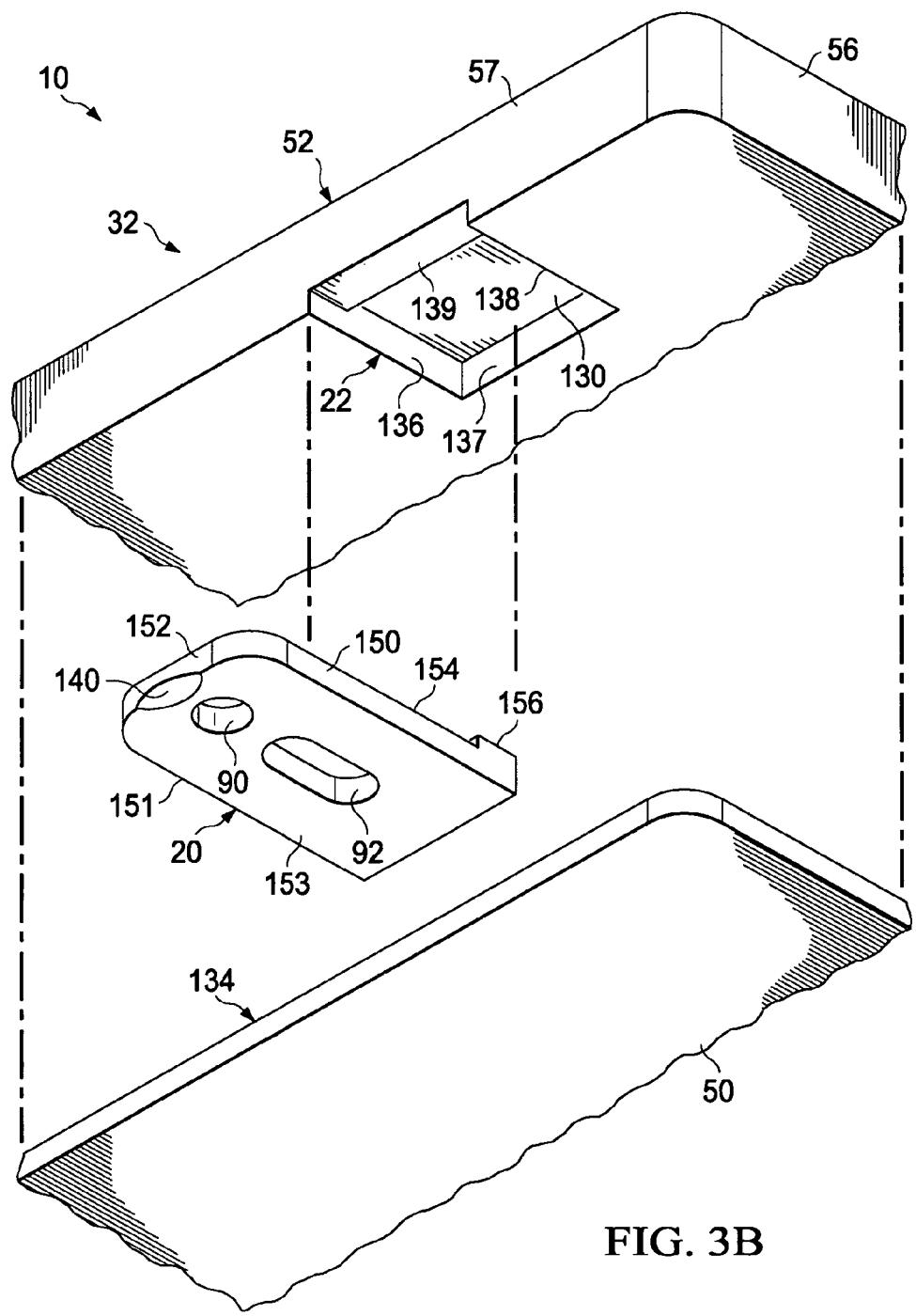
FIG. 3B illustrates an exploded assembly view of the physical security component of FIG. 3A.

FIGS. 3A and 3B illustrate another embodiment of physical security component 20. In FIG. 3A, physical security component 20 is configured to slide into and out of slot 22 along an axial direction 104 and opposite thereto. In the illustrated embodiment, in both the retracted and extended positions, slot 92 is disposed in a proximal position and lock hole 90 is in a distal position relative to side wall 57 of base member 32. However, it should be understood that the positions of lock hole 90 and slot 92 may be interchanged and/or otherwise oriented (e.g., side-by-side, etc.). It should be also understood that more and/or fewer openings (e.g., lock hole 90, slot 92, etc.) may be disposed on physical security component 20.

In FIG. 3B, physical security component 20 is illustrated in an extended position relative to side wall 57 having been slid outwardly in direction 104 relative to housing 42. In FIG. 3B, physical security component 20 is configured to be recessed in slot 22 between working surface 52 and bottom wall 50 of base member 32. In the illustrated embodiment, slot 22 comprises top wall 130, bottom wall 134, side walls 136, 137, and 138, and a lip 139. Lip 139 is configured to stop and/or prevent physical security component 20 from being completely removed from base member 32 of portable electronic device 10. In some embodiments, lip 139 is a rectangular shape extending along the entire external periphery of slot 22. It should be understood, however, that lip 139 may also comprise any other shape and may also be divided into one or more sections and extend along a portion of the external periphery.

Physical security component 20 comprises a lip 156 extending from top wall 154 of physical security component 20. Lip 156 of physical security component 20 is configured to cooperate with lip 139 of slot 22 to substantially prevent physical security component from being removed from portable electronic device 10. In FIG. 3B, physical security component 20 comprises grip 140 disposed along a front wall 152 of physical security component 140 to enable a user to grip and/or slide physical security component 20 away from base member 32 of portable electronic device 10 from a retracted position.

In some embodiments, bottom surface 130 of slot 22 may comprise one or more detents, which enable physical security component 20 to be secured in discrete positions between the home and extended positions. Furthermore, in some embodiments, physical security component 20 may also be configured with an actuation mechanism (e.g., spring-actuated button, etc.) to enable physical security component 20 to be automatically opened and/or extended upon activation of the actuation mechanism. Moreover, in some embodiments, side wall 57 and/or slot 22 may also comprise a locking mechanism which locks physical security component 20 in place when physical security component 20 is in a home position.

Figure 4A:
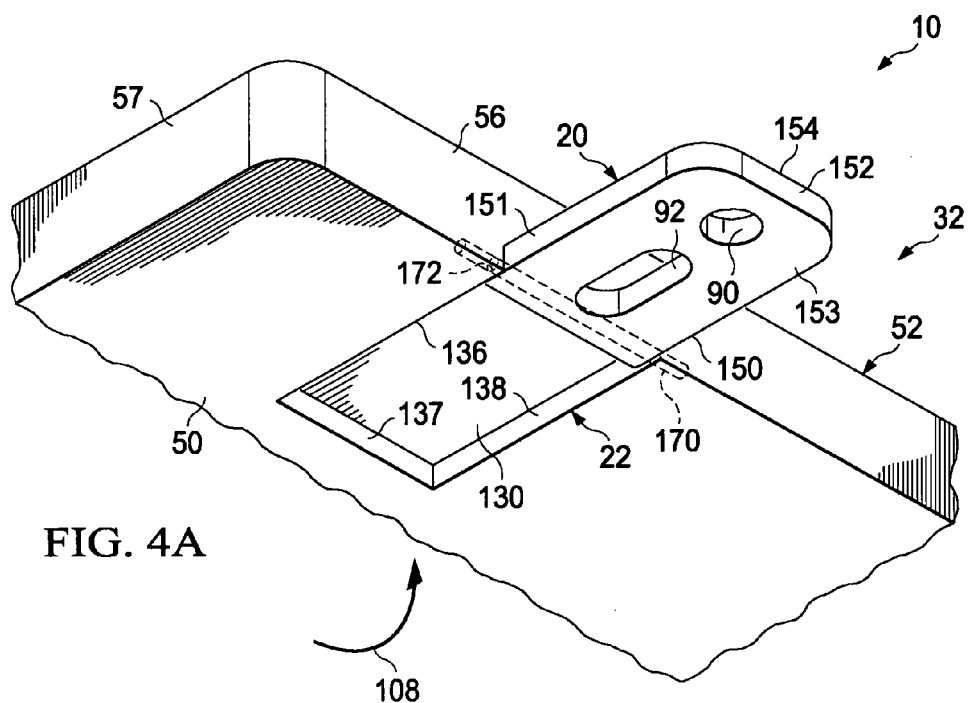
FIG. 4A illustrates an exploded assembly view of another embodiment of the physical security component of FIG. 1.
Figure 4B:
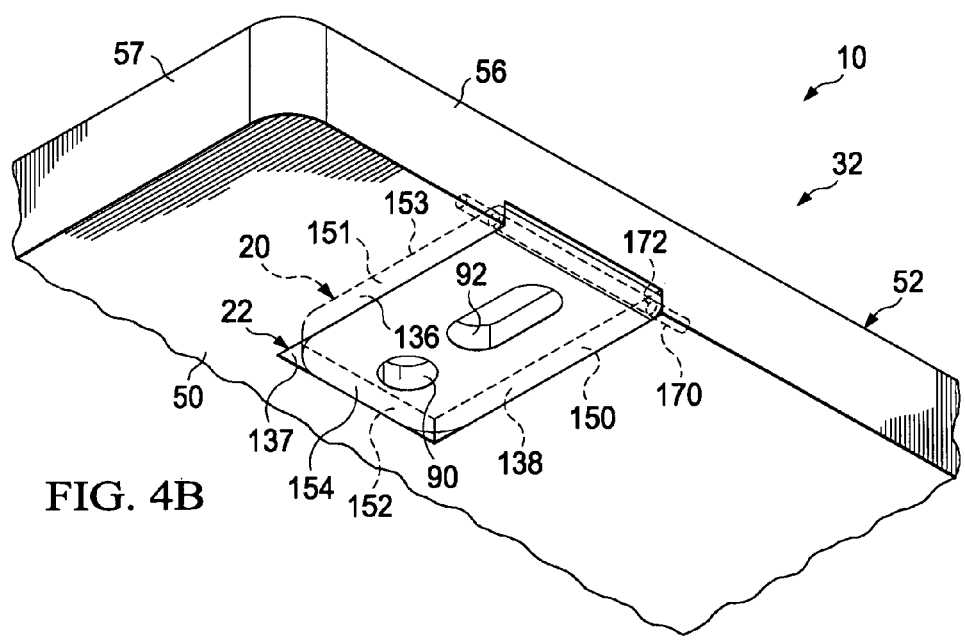
FIG. 4B illustrates another view of the physical security component of FIG. 4A.

FIGS. 4A and 4B illustrate another embodiment of physical security component 20 of FIG. 1. Referencing FIG. 4A, physical security component 20 is configured to extend and/or rotate away from bottom wall 50 of base member 32 in a direction 108 and opposite thereto. In some embodiments, top wall 154 of physical security component 20 is flush against the housing 42 of base member 32, thereby forming a portion of bottom wall 50 of electronic device 10 when physical security component 20 is in a retracted and/or home position in slot 22 (as illustrated in FIG. 4B).

In FIG. 4A, in both the retracted and extended positions, slot 92 is disposed in a proximal position and lock hole 90 is in a distal position relative to back wall 56 of base member 32. However, it should be understood that the positions of lock hole 90 and slot 92 may be interchanged and/or otherwise oriented (e.g., side-by-side, etc.). It should be also understood that more and/or fewer openings (e.g., lock hole 90, slot 92, etc.) may be disposed on physical security component 20.

In FIG. 4B, physical security component 20 is in a home and/or fully retracted position in slot 22. In FIG. 4B, physical-security component 20 illustrates a fastener 170 (e.g., a hinge pin) extending from side wall 151 through side wall 150 via aperture 172 of physical security component 20 and disposed adjacent to an internal side of back wall 56. Fastener 170 extends into a portion of side wall 136 and 138 of slot 22, thereby creating an axis about which physical component 20 can rotate and securing physical security component to housing 42. Thus, in operation, physical security component 20 rotates about the axis created by fastener 170 in direction 108 and opposite thereof, thereby enabling physical security component 20 to be positioned, respectively, in a home position, an extended position, or any other position therebetween.

Embodiments of portable electronic device 10 may be manufactured by integrating physical security component 20 into housing 42 of the portable electronic device 10, wherein physical security component 20 is configured to be in a retracted position and an extended position relative to housing 42 of portable electronic device 20, and wherein physical security component 20 has at least two differently shaped openings (e.g., lock hole 90 and slot 92) enabling at least two different types of security devices to be coupled to the at least two differently shaped openings. Portable electronic device 10 may be further manufactured by configuring the physical security component 20 to be rotatably extendible relative to the housing 42 of the portable electronic device 10. Moreover, the method of manufacturing may further comprise configuring the physical security component 20 to be slideably extendible relative to the housing 42 of the portable electronic device 10. The method of manufacturing may also further comprise configuring the physical security component 20 to extend from a side wall 57 of the housing 42 of the portable electronic device 10. The method of manufacturing may also comprise configuring the physical security component 20 comprising a gripping mechanism 140 configured to facilitate extending the physical security component 20 from the housing 42. The method may also further comprise configuring the portable electronic device 10 comprising at least one detent 126 configured to secure the physical security component 20 in a discrete location between the retracted position and the extended position relative to the housing 42.

Therefore, embodiments of portable electronic device 10 are configured to enable physical security component 20 to be retracted within and extended from a housing (e.g., housing 42) of portable electronic device 10. Physical security component 20 is not limited to a particular type of locking device and enables more than one type of locking device (e.g., a pad lock, lock 80, etc) to be used to be secured and/or coupled to electronic device 10.

What is claimed is:

1. A portable electronic device, comprising:
    a physical security component configured to be in a retracted position and an extended position relative to a housing of the portable electronic device, the physical security component having at least two differently shaped openings enabling at least two different types of locking devices to be coupled to the at least two differently shaped openings.

2. The device of claim 1, wherein the physical security component is rotatably extendible relative to the housing of the portable electronic device.

3. The device of claim 1, wherein the physical security component is axially extendible relative to the housing of the portable electronic device.

4. The device of claim 1, wherein the physical security component is configured to be extended from a side wall of the housing of the portable electronic device.

5. The device of claim 1, wherein the physical security component is configured to be extended from a bottom wall of the housing of the portable electronic device.

6. The device of claim 1, wherein the physical security component comprises a gripping mechanism configured to facilitate extending of the physical security component from the housing.

7. The device of claim 1, wherein the portable electronic device comprises at least one detent configured to secure the physical security component in a discrete location between the retracted position and the extended position relative to the housing.

8. A method for manufacturing a portable electronic device, comprising:
    integrating a physical security component into a housing of the portable electronic device, the physical security component configured to be in a retracted position and an extended position relative to the housing of the portable electronic device, the physical security component having at least two differently shaped openings enabling at least two different types of security devices to be coupled to the at least two differently shaped openings.

9. The method of claim 8, further comprising configuring the physical security component to be rotatably extendible relative to the housing of the portable electronic device.

10. The method of claim 8, further comprising configuring the physical security component to be axially extendible relative to the housing of the portable electronic device.

11. The method of claim 8, further comprising configuring the physical security component to extend from a side wall of the housing of the portable electronic device.

12. The method of claim 8, further comprising configuring the physical security component to extend from a bottom wall of the housing of the portable electronic device.

13. The method of claim 8, further comprising configuring the physical security component having a gripping mechanism configured to facilitate extending of the physical security component from the housing.

14. The method of claim 8, further comprising configuring the portable electronic device having at least one detent configured to secure the physical security component in a discrete location between the retracted position and the extended position.

15. A portable electronic device, comprising:
    a physical security means extendible relative to a housing means of the portable electronic device, the physical security means having at least two differently shaped openings enabling at least two different locking means to be coupled to the at least two differently shaped openings.

16. The device of claim 15, further comprising a gripping means for facilitating extending of the physical security means from the housing means of the portable electronic device.

17. The device of claim 15, further comprising a securing means for securing the physical security means in discrete locations between a retracted position and an extended position.

18. The device of claim 15, further comprising a means for enabling rotatable movement of the physical security means relative to the housing means.

19. The device of claim 15, further comprising a means for enabling axial movement of the physical security means relative to the housing means.

* * * * *